(12) United States Patent
LaRue

(10) Patent No.: US 7,836,661 B2
(45) Date of Patent: *Nov. 23, 2010

(54) METHOD OF CAMOUFLAGING A STRUCTURE AGAINST A BACKGROUND HAVING A GENERALLY UNIFORM COMPOSITION

(76) Inventor: John J. LaRue, 128 River Rd., Underhill, VT (US) 05489

( * ) Notice: Subject to any disclaimer, the term of this patent is extended or adjusted under 35 U.S.C. 154(b) by 816 days.

This patent is subject to a terminal disclaimer.

(21) Appl. No.: 11/677,608

(22) Filed: Feb. 22, 2007

(65) Prior Publication Data

US 2007/0144109 A1    Jun. 28, 2007

Related U.S. Application Data

(62) Division of application No. 10/726,205, filed on Dec. 1, 2003, now Pat. No. 7,216,463, which is a division of application No. 09/676,878, filed on Sep. 29, 2000, now Pat. No. 6,655,102.

(60) Provisional application No. 60/157,036, filed on Oct. 1, 1999.

(51) Int. Cl.
*E04B 1/18* (2006.01)
*E04B 1/19* (2006.01)
*B44F 7/00* (2006.01)
*B44F 9/00* (2006.01)

(52) U.S. Cl. ........... 52/745.19; 52/745.17; 52/311.1; 359/838; 359/850; 359/853; 359/856

(58) Field of Classification Search ........ 52/311.1–312, 52/633, 741.1, 741.13, 741.14, 741.15, 741.3, 52/745.05, 745.06, 745.1, 745.13, 745.17, 52/745.19; 126/569, 575, 684, 698, 850–855, 126/883, 599, 615, 536; 359/838, 850, 853, 359/856, 855
See application file for complete search history.

(56) References Cited

U.S. PATENT DOCUMENTS

| | | | |
|---|---|---|---|
| 1,305,296 A | | 6/1919 | Mackay |
| 2,292,848 A | * | 8/1942 | Robson ............... 114/15 |
| 2,398,620 A | | 4/1946 | Cockrell |
| 3,576,563 A | | 4/1971 | Scott et al. |
| 4,087,159 A | | 5/1978 | Ulrich |
| 4,192,576 A | | 3/1980 | Tung et al. |
| 4,256,366 A | * | 3/1981 | Buckelew ............ 359/548 |
| 4,299,442 A | | 11/1981 | Buckelew |
| 4,347,284 A | | 8/1982 | Tsutomu et al. |

(Continued)

FOREIGN PATENT DOCUMENTS

GB    521571    5/1940

*Primary Examiner*—Jeanette Chapman
(74) *Attorney, Agent, or Firm*—Downs Rachlin Martin PLLC

(57) ABSTRACT

A method of camouflaging a structure against a background having a generally uniform composition of hue, saturation and brightness. In one embodiment, spaced regions on the exterior of a structure are colored with differing colors and regions between the spaced regions are colored with a gradient of the differing colors so as to create a gradual color transition between the spaced regions. In another embodiment, at least one reflector and, optionally at least one color filter, are located on a structure to reflect light in the foreground to a vantage point, and optionally filter such light, so as to effect a blending of at least a portion of the structure into the background when viewed from the vantage point.

19 Claims, 11 Drawing Sheets

U.S. PATENT DOCUMENTS

| | | | |
|---|---|---|---|
| 4,465,731 A | 8/1984 | Pusch et al. | |
| 4,506,467 A | 3/1985 | Strung | |
| 4,560,595 A * | 12/1985 | Johansson | 428/17 |
| 4,560,608 A * | 12/1985 | Pusch et al. | 428/196 |
| 4,611,524 A | 9/1986 | Ferris | |
| 4,868,019 A * | 9/1989 | Knickerbocker | 428/17 |
| 4,953,922 A | 9/1990 | Granqvist | |
| 5,027,566 A | 7/1991 | Gilowski | |
| 5,043,202 A * | 8/1991 | Knickerbocker | 428/195.1 |
| 5,122,657 A * | 6/1992 | De Bie et al. | 250/227.2 |
| 5,142,833 A | 9/1992 | Svehaug | |
| 5,220,631 A | 6/1993 | Grippin | |
| 5,347,435 A | 9/1994 | Smith et al. | |
| 5,373,863 A * | 12/1994 | Prizio | 135/97 |
| 5,418,582 A | 5/1995 | van Saarloos | |
| 5,540,978 A | 7/1996 | Schrenk | |
| 5,592,960 A | 1/1997 | Williams | |
| 5,617,692 A * | 4/1997 | Johnson et al. | 52/651.02 |
| 5,674,605 A | 10/1997 | Marecki | |
| 5,846,614 A * | 12/1998 | Conner | 428/15 |
| 5,852,424 A | 12/1998 | Reineck et al. | |
| 5,985,381 A * | 11/1999 | Conner | 428/15 |
| 5,991,048 A | 11/1999 | Karlson et al. | |
| 6,032,070 A | 2/2000 | Flock et al. | |
| 6,040,881 A * | 3/2000 | Koyama | 349/8 |
| 6,061,828 A | 5/2000 | Josephs | |
| D426,128 S | 6/2000 | Lamond et al. | |
| 6,163,400 A * | 12/2000 | Nanba | 359/365 |
| 6,278,847 B1 | 8/2001 | Gharib et al. | |

\* cited by examiner

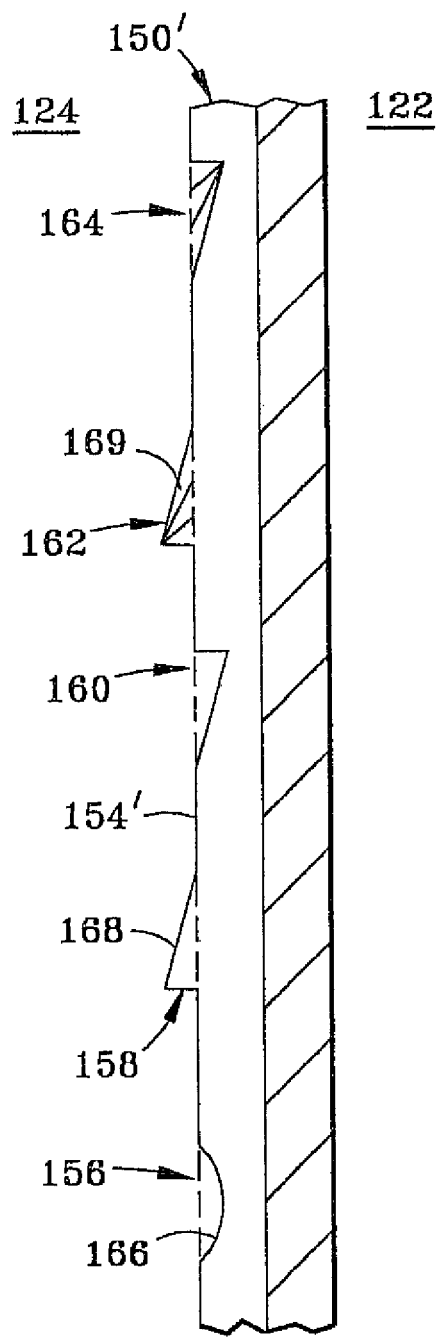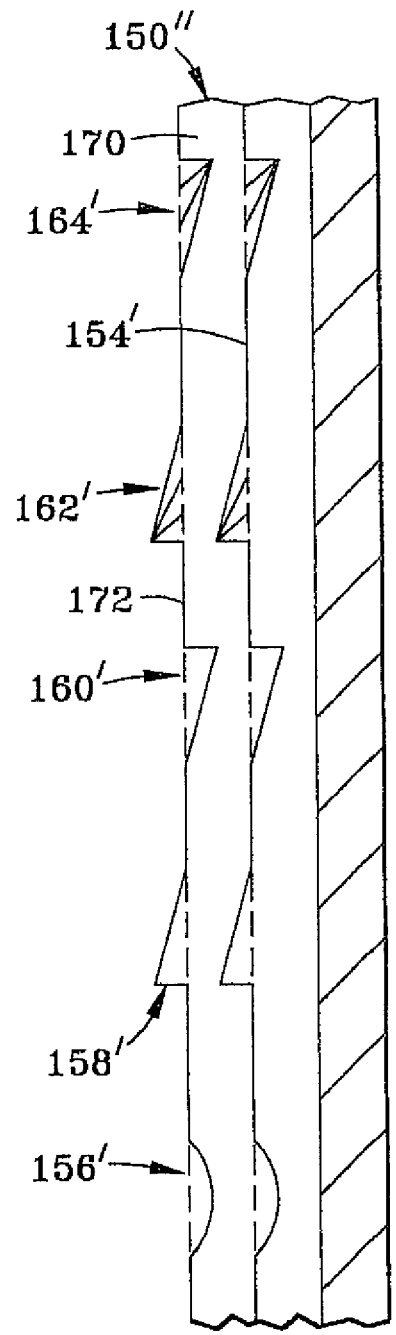
FIG. 5A
FIG. 5B

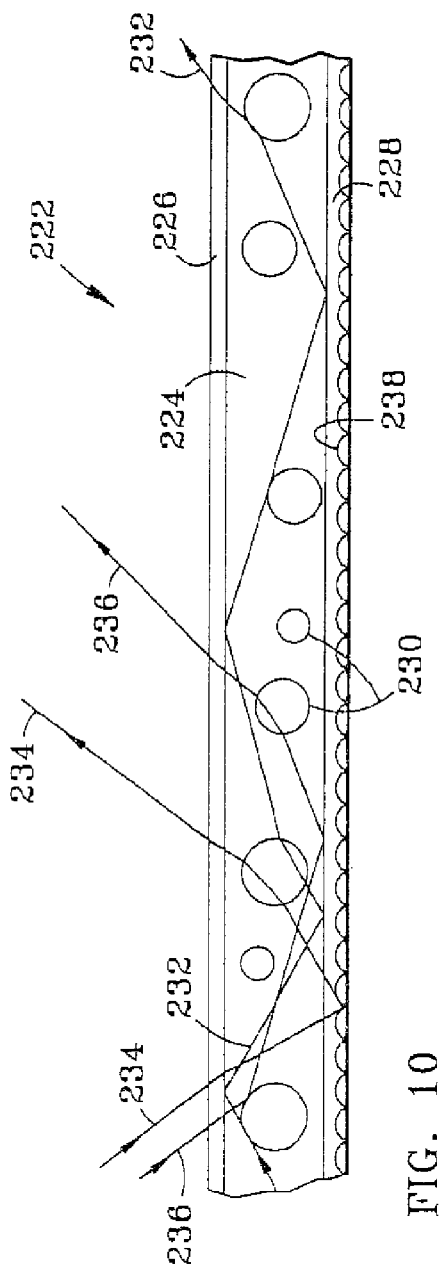
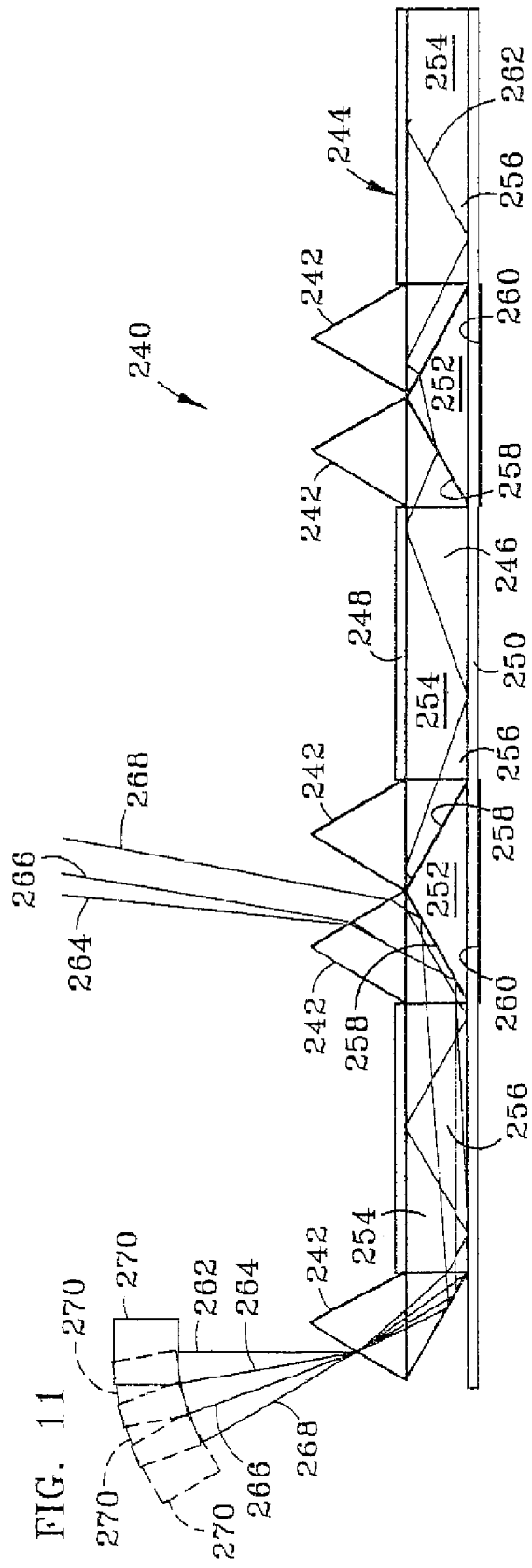
FIG. 10
FIG. 11

METHOD OF CAMOUFLAGING A STRUCTURE AGAINST A BACKGROUND HAVING A GENERALLY UNIFORM COMPOSITION

RELATED APPLICATION DATA

This application is a divisional of U.S. Nonprovisional patent application Ser. No. 10/726,205, filed on Dec. 1, 2003 and titled "Camouflaged Structure And Method Of Camouflaging A Structure Against A Background Having A Generally Uniform Composition," which is a divisional of U.S. Nonprovisional patent application Ser. No. 09/676,878, filed on Sep. 29, 2000 and titled "Camouflaged Structure And Method Of Camouflaging A Structure Against A Background Having A Generally Uniform Composition," now U.S. Pat. No. 6,655,102 issued Dec. 2, 2003, that claims the benefit of priority of U.S. Provisional Patent Application Ser. No. 60/157,036, filed Oct. 1, 1999 entitled "Reduced Visibility for Structures Which Have Sky as Background." Each of these applications is incorporated herein by reference in its entirety.

FIELD OF INVENTION

The present invention relates generally to the field of camouflage. More particularly, the present invention is directed to a camouflaged structure and a method of camouflaging a structure against a background having a generally uniform composition.

BACKGROUND

Skylines are becoming less visually attractive due to the addition of tall structures that are not visually integrated into their surroundings and therefore stand out against their backgrounds, which frequently includes the sky. For example, with the continuing proliferation of mobile communications devices such as cellular telephones, personal digital assistants (PDAs), pagers, text messaging devices and the like, mobile communications service providers are constructing more and more antenna facilities, including cell towers, to improve the quality of existing services, increase the variety of services offered and increase the coverage area of their services. Thus, service providers are not only adding more cell towers to urban and suburban regions where cell towers already exist, they are constructing new towers in regions where no facilities had existed. In addition, a service region may have more than one service providers, each having its own cell towers separate from the cell tower(s) of the other service provider(s).

To optimize a cell tower's coverage area, the cell tower should generally have its antenna(s) located high above the ground and at a location unobstructed by adjacent objects, such as buildings, trees and mountains, among others. To achieve this goal, cell towers typically extend above the highest features within their respective coverage area. Since cell towers generally extend above most or all of surrounding objects, viewers typically view these structures against a background sky.

Until relatively recently, service providers made no attempts to lessen the visual impact of their cell towers, other than perhaps painting them a with a light-color paint, such as a neutral gray. However, due to the large number of cell towers being constructed and increased concern over the aesthetic impact of these cell towers, more and more communities are banning cell towers within their jurisdictions. In response, service providers are attempting to make their cell towers more attractive, e.g., by disguising, or camouflaging, them as other objects, such as trees and cactuses. The realism of such disguises, however, has generally been less than desirable because the cell towers are typically significantly larger than typical simulated object and the geometrical requirements of the cell towers are not suited to simulating such objects.

Other conventional visual camouflaging techniques are generally not suitable for reducing the visual impact of cell site antennas and support towers. Conventional visual camouflaging techniques are generally one of two types. The first type is used when the environment surrounding an object to be visually concealed is non-uniform, i.e., contains a plurality of juxtaposed regions that visually contrast with one another to form repeating patterns, random patterns or a combination of repeating and random patterns. Such patterns are found in, e.g., cityscapes, landscapes and seascapes, which are generally viewed horizontally, and aerial views of natural and manmade features on the surface of the earth. In this type of camouflage, the goal is provide a pattern, or image, that simulates a pattern contained in the background against which a structure is viewed between a viewer and the structure so that the viewer confuses the simulated pattern with the background pattern and thus cannot readily distinguish the outline and/or other features of the structure from the background.

Examples of pattern camouflaging include U.S. Pat. No. 1,305,296 to MacKay and U.S. Pat. No. 2,292,848 to Robson. Each of these patents discloses a technique of painting a ship with various patterns comprising discrete regions of certain colors. In MacKay, the pattern is designed to simulate a seascape. In Robson, the pattern provides a compromise between concealment against a seascape and deceiving an observer as to attributes, such as size, shape, speed and direction of travel, of the ship once the ship has been spotted. Creating patterns from discrete regions of different colors is not suitable for concealing a structure against a generally uniform background such as the sky.

Examples of image camouflaging include U.S. Pat. No. 5,142,833 to Svehaug, U.S. Pat. No. 5,373,863 to Prizio and U.S. Pat. No. 5,220,631 to Grippin. Svehaug discloses a camouflage screen comprising a panel for placing between a user and an observer. The panel has a planar reflective surface that, when properly positioned, generally faces and is slanted toward the observer so that the user is concealed behind the panel and an image of the terrain below the slanted panel is reflected to the observer. Prizio discloses a camouflage blind for placing between one or more users and an observer. The blind comprises a plurality of panels pivotably attached to one another along adjacent edges so that the blind can be easily stored, transported and set up in the field. Each of the panels includes a planar reflective surface that, when properly positioned, generally faces the observer and reflects to the observer an image of one or more objects contained in the foreground of the reflective surface. The devices of Svehaug and Prizio are not suitable for being mounted on a structure, such as a cell tower.

Grippin discloses a camouflage device that uses optic fiber cables to conceal an object by transferring an image of the background (as viewed by a viewer) of the object to the foreground of the object. The device comprises a plurality of background imaging lenses, a plurality of foreground imaging lenses and a plurality of optic fibers that each connect a background imaging lens to a corresponding foreground imaging lens. The background imaging lens creates an image of the background that is transferred to the foreground imaging lens via the corresponding optic fiber. The foreground lens then forms an image of the background that is viewed by the viewer in the foreground of the device. Due to the necessity for optical quality lenses and the complexity of this device, it is not a practical option for camouflaging a large structure, such as a cell site antenna support tower. In addition, this device would be difficult, if not impossible, to adapt to provide such images for a full 360° around a structure.

The second type of camouflaging technique is used to conceal an object against a background having a generally uniform composition of hue, saturation and brightness, wherein the object subtends a small arc of view. An example of this technique is U.S. Pat. No. 4,611,524 to Ferris, which discloses a camouflaged vehicle, such as an aircraft, surface vehicle or the like, at least a portion of which remains undetected until the vehicle subtends an arc of substantially five minutes when used against at least one predetermined light background reflectivity. One surface of the vehicle includes a substantial area of a predetermined reflectance that matches the reflectance of the predetermined light background. The area includes at least three defined portions, at least two of the portions having different reflectance so that when the reflectance of one of the defined portions is added to the total reflectance of the others of the three defined portions and the results averaged, they will have a reflectance substantially that of the predetermined light background. A limitation of this technique is that it is only suitable for objects subtending small arcs of view. Thus, this technique is not effective for large objects, such as cell site support towers, that are frequently viewed at a subtended arc of much greater than five minutes. In addition, this technique is not suitable when the foreground is brighter than the background.

In view of the foregoing, there is a need for a camouflaging technique that is economical and is capable of providing a large structure, such as a cell tower, with reduced visibility against a background, such as the sky, having a generally uniform composition of hue, saturation and brightness.

SUMMARY OF THE DISCLOSURE

In one embodiment, a method of camouflaging a surface of a structure against a background containing, simultaneously or at differing times, a first color and a second color, the method comprising: coloring a first region of the surface with a third color that is substantially the same as the first color; coloring a second region of the surface adjacent the first region with a fourth color that is substantially the same as the second color; and providing a third region between the first region and the second region, the third region containing the third color and the fourth color combined to form a color gradient such that the third region contains a gradual transition from the third color in the first region to the fourth color in the second region.

In another embodiment, a method of camouflaging an exterior surface of a structure not intended for human occupancy, the structure located between a vantage point and a background having a first generally uniform composition, wherein a foreground extends away from the structure in a direction opposite the background, the foreground having a second generally uniform composition substantially the same as the first generally uniform composition, the method comprising: locating at least one semi-diffuse reflector between the vantage point and an exterior surface of a structure not intended for human occupancy, the at least one semi-diffuse reflector including a corresponding respective reflective surface; and positioning each of the at least one semi-diffuse reflector such that the corresponding respective reflective surface reflects light from a portion of the foreground to the vantage point so as to effect a blending of at least a portion of the structure into the background when viewed from the vantage point.

In still another embodiment, a method of camouflaging an exterior surface of a structure not intended for human occupancy, the structure located between a vantage point and a background having a first generally uniform composition, wherein a foreground extends away from the structure in a direction opposite the background, the foreground having a second generally uniform composition comprising characteristic wavelengths of visible light and being substantially the same as the first generally uniform composition, the method comprising: locating at least one reflector between the vantage point and an exterior surface of a structure not intended for human occupancy, the at least one reflector including a corresponding respective reflective surface positioned so as to reflect light from a portion of the foreground to the vantage point to effect a blending of the structure into the background when viewed from the vantage point; and positioning a filter between the vantage point and each the corresponding respective reflective surface, the filter for filtering at least one wavelength of visible light that is different from the characteristic wavelengths of visible light.

BRIEF DESCRIPTION OF THE DRAWINGS

For the purpose of illustrating the invention, the drawings show a form of the invention that is presently preferred. However, it should be understood that the invention is not limited to the precise arrangements and instrumentalities shown in the drawings.

FIGS. 5A and 5B are partial cross-sectional views of the vertical support of FIG. 1 illustrating alternative embodiments of the semi-diffuse reflector camouflage of FIG. 4.

FIG. 10 is a cross-sectional view of the light conductor of an alternative embodiment of a camouflaging member in accordance with the third aspect of the present invention.

FIG. 11 is a cross-sectional view of another alternative embodiment of a camouflaging member in accordance with the third aspect of the present invention.

DETAILED DESCRIPTION

Figure 1:
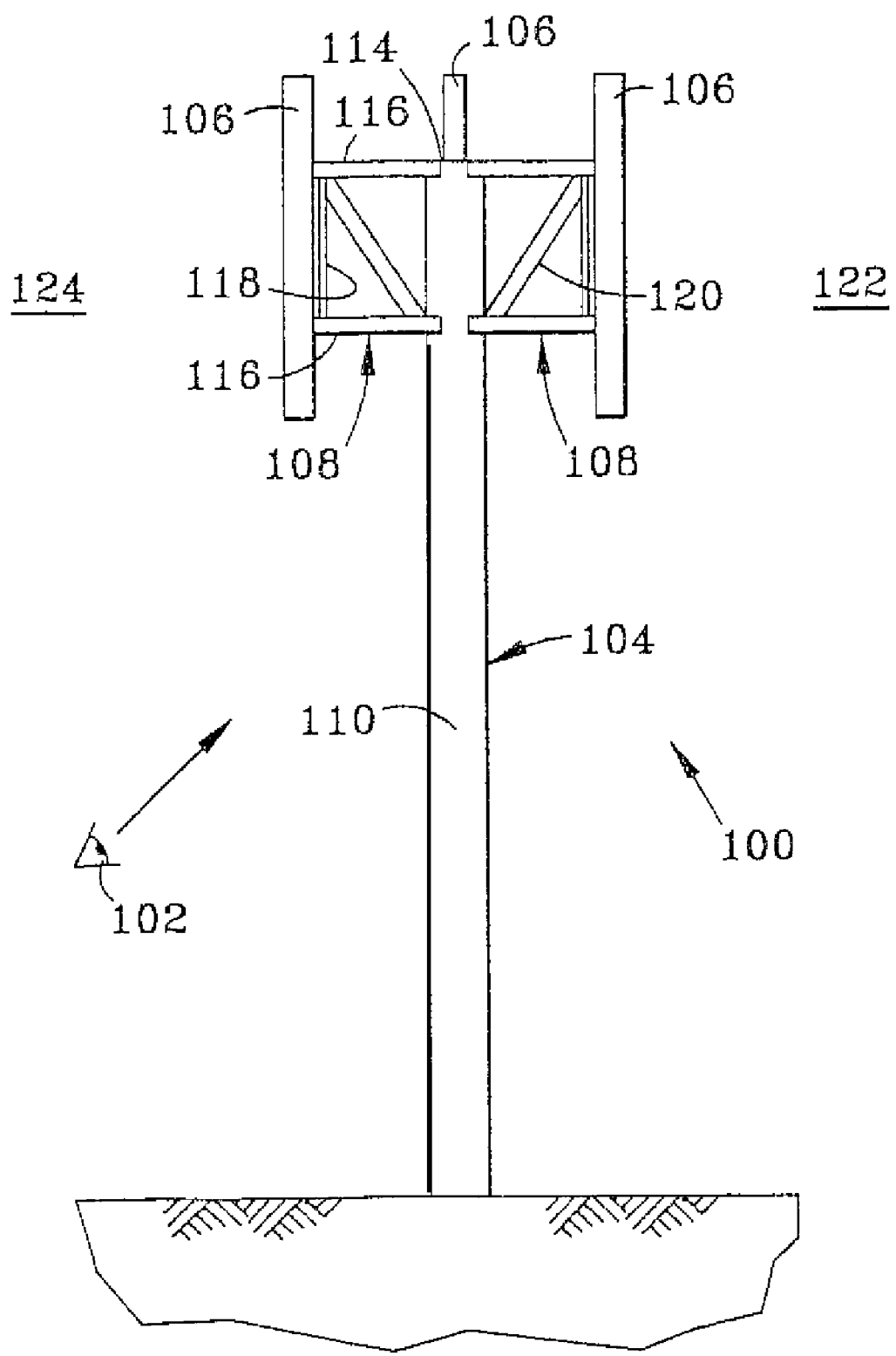
FIG. 1 is an elevational view of a cell tower camouflaged in accordance with various aspects of the present invention.

Referring now to the drawings, wherein like numerals indicate like elements, there is shown in FIG. 1 a cell tower, which is denoted generally by the numeral 100. Each component of cell tower 100 includes camouflage of the present invention that decreases the visual impact of that component when viewed by a viewer (not shown) against the sky from an expected vantage point 102. In a first aspect, the camouflage technique of the present invention comprises applying regions of two or more colors to one or more components of cell tower 100, wherein the colors are selected to match the composition (hue, saturation and brightness) of the sky. In a second aspect, the camouflage technique of the present invention comprises providing one or more components of cell tower 100 with reflectors that reflect colors (light) from the ambient slay to a viewer. In a third aspect, the camouflage technique of the present invention comprises providing one or more components of cell tower 100 with one or more camouflaging members that capture light from the sky, conduct the captured light to toward the viewer and emit the captured light toward the viewer. Each of these aspects is described below in more detail.

The camouflaging techniques of the present invention are particularly suited for structures that are not intended to be occupied by humans and because of their size, shape and/or primary function, are generally difficult to visually integrate into their surroundings. Thus, although the invention is described with respect to cell tower 100, one skilled in the art will understand that the camouflaging techniques of the present invention may be used to reduce, or eliminate, the visibility of many other structures and/or components thereof such as power transmission support towers and cables, light posts, guy wires, chimneys, hyperbolic cooling towers, microwave communication towers, radio and television antennas and support towers, suspension and cable-stayed bridge support towers and cables and water towers, among others. Such structures primarily comprise functional components having unattractive non-specular visible surfaces. In addition, the camouflaging techniques of the present invention may be used to reduce, or eliminate, the visibility of structures against backgrounds other than the sky having uniform hues, saturation and brightness. Examples of other backgrounds include a sea, ocean or other body of water near the horizon and generally bright landscapes containing features such as snow and sand.

Cell tower 100 includes a vertical support 104, a plurality of antennas 106 and a plurality of antenna support brackets 108. Vertical support 104 comprises an elongate cylindrical tube 110 having a lower end 112 affixed to a foundation (not shown) and an upper end 114 located high above the foundation. Each antenna 106 is attached to tube 110 adjacent upper end 114 by one of brackets 108. Each antenna 106 may be any type of communications antenna such as an RF transceiver antenna for mobile communications devices, an RF transmitting antenna for radio, TV or the like or a microwave relay antenna for long distance transmission of signals, among others. The details of such antennas are not important to the invention and are know to those skilled in the art. Therefore, they are not discussed in detail herein. Each bracket 108 includes two horizontal members 116, a vertical member 18 and a diagonal member 120.

Cell tower 100 is merely illustrative of the many variations of cell towers possible. Other embodiments may include vertical supports of other tubular shapes, such as hexagonal, or other structures, such as latticed strictures made from tubular members or other structural shapes. In addition, guy wires may be provided to stabilize the upper end of cell towel in the horizontal direction. One skilled in the art will recognize that there are many configurations of cell towers possible and, therefore, each configuration need not be described in detail herein.

Due to its height, cell tower 100 will generally be viewed as shown in FIG. 1, i.e., with a viewer looking from a vantage point, such as vantage point 102, generally upward above the horizon at one or more components of the cell tower. However, cell tower 100 may also be viewed on the horizon, e.g., when the cell tower is located on a hilltop and the viewer is located on an adjacent hilltop or when the cell tower is located on top of a building and the viewer is on top of an adjacent structure of similar height. Regardless of the vantage point from where viewer views cell tower 100, it is important for the invention that a portion of the sky, or other generally uniform background, be in the background.

As used herein and in the claims appended hereto, the entirety of the sky surrounding cell tower may be considered to consist of two regions, a background sly 122, which is generally the position of the sky that appears to viewer or is obscured by the cell tower or portion thereof when looking at the cell tower or portion thereof, and a foreground sky 124, which is generally the portion of the sky other than the background sly. Thus, depending on the location of vantage point 102 and the viewing direction, background sky 122 may include a region of the sky near the horizon, at the zenith and/or any region therebetween.

Figure 2A:
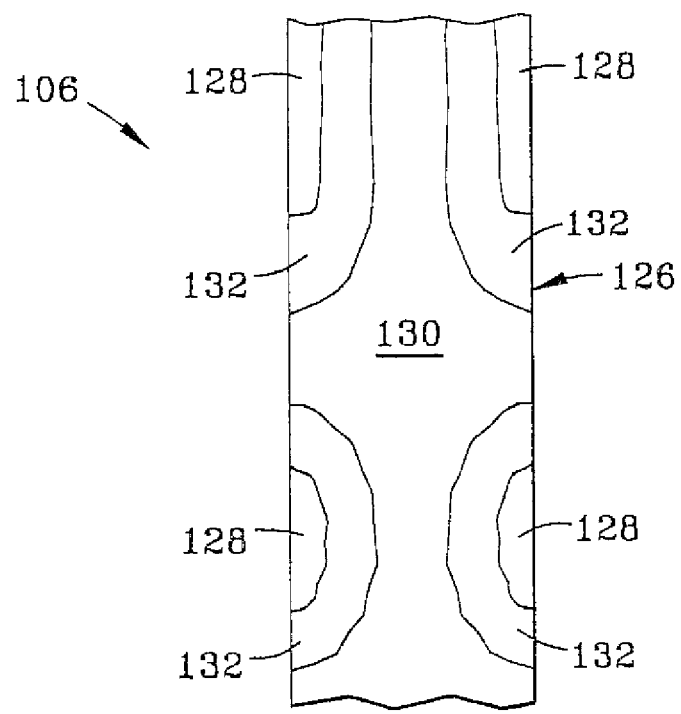
FIGS. 2A and 2B are partial elevational views of one of the antennas of FIG. 1, illustrating various camouflage patterns in accordance with a camouflaging technique of a first aspect of the present invention.

Referring now to FIG. 2A, there is illustrated one of antennas 106 of FIG. 1. Antenna 106 includes camouflage in accordance with the first aspect of the present invention mentioned above. This aspect comprises providing a pattern 126 of two or more colors between vantage point 102 (FIG. 1) and antenna 106, which is desired to be concealed. Pattern 126 may be provided by applying the pattern directly to the outer surface of antenna 106, e.g., using paint, decals or other surface treatment containing the appropriate colors and arrangement of colors. Alternatively, pattern 126 may be provided on a covering structure (not shown), such as a screen or other enclosure, that is separate from antenna 126 and surrounds at least a portion of the antenna that would otherwise be seen from a vantage point 102. Preferably, the structure should be transparent to the operating energy of antenna 106 so that the efficiency of the antenna is not degraded by the structure.

In its basic form, pattern 126 includes a first region 128, a second region 1130 and a third region 132 located between the first and second regions. First and second regions 128, 130 are composed of, respectively, first and second predominant colors selected to exactly, or substantially, match two colors that predominate in background sky 122. Since the composition (hue, saturation and brightness) of background sky 122 changes throughout the day and with ambient weather conditions, the colors selected for first and second predominant colors are preferably two colors that predominate during the time of day and/or weather condition during which it is most desired to obscure antenna 106. Typically, the colors selected will be colors that predominate in daylight sky.

Since the composition of daylight sky varies over time and with location, first and second predominant colors can be selected to approximate the composition of background sky over a range of similar sky conditions. For example, when cell tower 100 is viewed from a vantage point where background sky 122 is the sky just above the horizon, first and second colors may be blue and white, since a cloudless blue sky contains more white at the horizon than at its zenith. The blue and white selected based on a cloudless sky would also be appropriate for a sky containing light clouds and blue regions interspersed with the lights clouds. The first and second predominant colors selected will generally be a compromise that provides a satisfactory appearance for the greatest amount of time. A preferred technique for selecting the colors for first and second regions 128, 130 is to view various combinations of a variety of colors against background sky 122 when the background sky has the composition at which antenna 106 is desired to be obscured.

Once first and second colors have been selected as described above and applied to the corresponding first and second regions 128,130 of pattern 126, third region 132 is created by transitioning the first color to the second color so that the third region contains a gradual color gradient from the first color at first region 128 to the second color at second region 130 using techniques known to those skilled in the art. A gradual color gradient is desired since the composition of background sky 122 will usually not includes sharp boundaries between regions of adjacent colors. Thus, the gradual gradient of third region 132 more precisely simulates the expected composition of background sky 122, causing pattern 126 to better obscure antenna 106. This approach differs from conventional camouflage techniques where a sharp transition line, rather than gradual color gradient, exists between adjacent color regions.

Figure 2B:
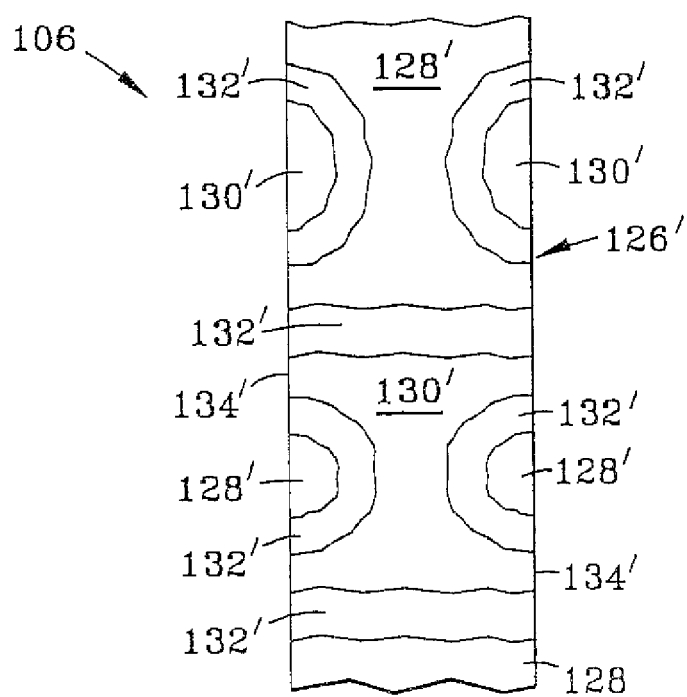

In an alternative embodiment wherein it is desired to reduce the visibility of antenna 106 over a larger range of compositions of background sky 122, a pattern 126' of first, second and third regions 128', 130', 132' may be provided as shown in FIG. 2B. Similar to pattern 126 of FIG. 2A, pattern 126' may contain two or more regions containing predominant colors. Pattern 126' comprises first and second regions 128', 130' containing first and second predominant colors, respectively. First predominant color is selected to be an "average" of a first composition of background sky 122. Second predominant color is selected to be an "average" of a second composition of background sky 122 different from the first composition. For example, first composition may be a cloudless blue sky at the horizon at mid-day such that the first predominant color may be an azure blue containing a white tint. Second composition may be a moderately cloudy sky at mid-day such that the second predominant color may be gray with a white tint.

An important feature of pattern 126' is the location of first and second regions 128', 130' with respect to one another and with respect to the edges 134 of antenna 106'. First and second regions 128', 130' alternate with one another in generally close proximity to one another, with third region 132' located between adjacent first and second regions 128', 130', along each edge 134. Thus, when the composition of background sky 122 contains the first composition, there is a good match between first region 128' and the background sky, obscuring edges 134 at the first regions. Similarly, when the composition of background sky 122 contains the second composition there is a good match between second region 130' and the background sky, obscuring edges 134 at the second regions. At compositions of background sky 122 intermediate the first and second compositions, there would be an acceptable match with both first and second regions 128', 130' and a good match with third region 132', obscuring edges 134 at the third region. Preferably, first and second regions 128', 130' are spaced from one another and sized such that at an expected vantage point the brain of a viewer will average the regions of pattern 126' of good color match to background sky 122 and the background sky adjacent those regions such that the other regions of the pattern 126' appear obscured to the viewer. For example, at an optimal spacing, if first regions 128' match the composition of background sky 122, then the brain of the viewer will average the color of first regions 128' and the adjacent color of the background sky to render second regions 130', at least the second regions at edges 134, obscured.

It is noted that patterns 126, 126' shown in FIGS. 2A and 2B are merely illustrative and one skilled in the art will recognize that there are many patterns and/or combinations of colors that fall within the scope of the present invention, which is defined by the appended claims. In addition, although the invention has been illustrated with two predominant colors, the invention equally applies to embodiments comprising three or more predominant colors.

Referring again to FIG. 1, vertical support 104 of cell tower 100 is camouflaged in accordance with the second aspect of the present invention mentioned above. In this aspect, a portion of the light from foreground sky 124 is reflected to vantage point 102 so that a viewer would see a reflection of a portion of foreground sky 124 when looking in the direction of background sky 122 so that vertical support 104 takes on the general appearance of the background sky.

Figure 3:
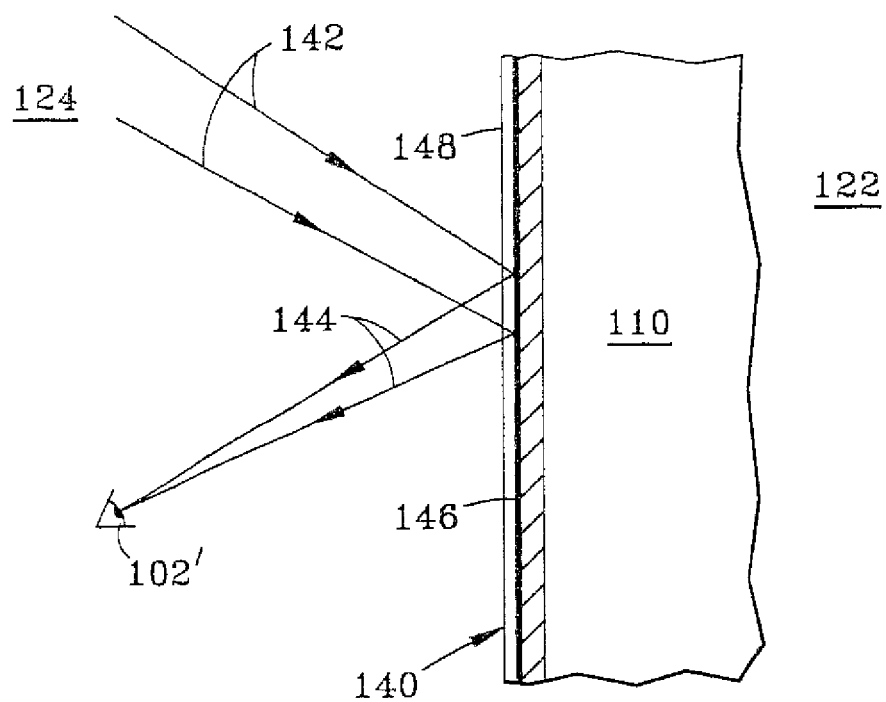
FIG. 3 is a partial cross-sectional elevational view of the vertical support of FIG. 1 illustrating a specular reflector camouflage in accordance with a second aspect of the present invention.

Referring now to FIG. 3, there is shown a reflector 140 applied to outer surface of tube 110 of FIG. 1. Reflector 140 is a highly-reflective specular reflector that reflects incident light rays 142 from foreground sky 124 to a viewer located at an expected vantage point 102' such that the reflected rays 144 form an image of a portion of the foreground sky at the expected vantage point. In the embodiment shown, reflector 140 is integral with tube 110 and conforms to the cylindrical shape of the tube. Reflector 140 may comprise a flexible element, such as a flexible sheet or tape made of metalized plastic, polished thin metal or the like or a rigid sheet, such as metalized plastic, metalized glass, polished metal or the like. In one embodiment, the outer surface of tube 10 may be provided with a plurality of reflectors 140 each including a reflective surface having an area of about 25 in$^2$ or less. Reflector 140 may be secured to tube 110 using one or more of a number of means known in the art such as adhesive bonding, mechanical fasteners, interlocking channels and the like.

Reflector 140 includes a reflective surface 146 facing vantage point 102'. Preferably, reflective surface 146 has a substantially constant reflectance across the spectrum of visible light such that the hue, saturation and brightness of the reflected light closely matches the hue, saturation and brightness, or composition of the incident light. In this manner, the reflected light will most closely match the hue, saturation and brightness of the light in background sky 122. The embodiment of FIG. 3 is generally appropriate when the reflection of the sun or other conspicuous discrete object is not important or the position of such object is such that the object is not contained in the image reflected to viewer.

Reflector 140 may optionally include a transparent layer 148 made of, e.g., acrylic, glass or other material, that covers reflective surface 146. Transparent layer 148 may serve at least two functions. First, transparent layer 148 may be provided as a protective layer for protecting reflective surface 146 from damage due to environmental elements. Second, transparent layer 148 may be provided as a filter to prevent reflector 140 from reflecting one or more wavelengths of unwanted light to a viewer. Accordingly, transparent layer 148 may be provided with one or more organic dyes and/or inorganic compounds that absorb one or more wavelengths of visible light desired to be removed from the light incident to reflector 140. Generally, the wavelengths desired to be absorbed are primarily in the range of green through red light. However, for certain applications it may be desired to remove other visible wavelengths such as yellow. For example, if foreground sky 124 contains the sun and it is desired to remove the orange and red components of the sunlight incident to reflector 140, certain dyes may be added to remove these components. Appropriate dyes for removing unwanted wavelengths are known to those skilled in the art and, therefore, are not enumerated herein. In some instances, e.g., when background sky 122 is the horizon and foreground sky 124 is a cloudless blue daylight sky, it is advantageous to not remove all of the yellow component of sunlight. Yellow is the complement of blue, and thus in this example would add whiteness to the reflected portion of blue foreground sky 124 to more closely match blue-white background sky 122 on the horizon.

Figure 4:
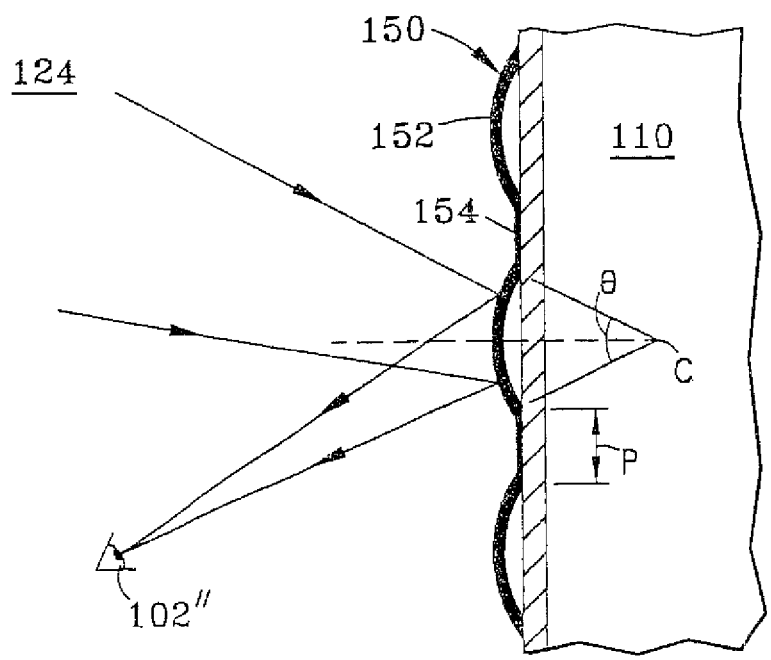
FIG. 4 is a partial cross-sectional elevational view of the vertical support of FIG. 1 illustrating a semi-diffuse reflector camouflage in accordance with a second aspect of the present invention.

Alternatively to providing a specular reflector as illustrated in FIG. 3, tube 110 may be provided with a semi-diffuse reflector, such as reflector 150 of FIG. 4. A semi-diffuse reflector is locally optically smooth to make it highly reflective, but has a long-range (compared to the wavelengths of visible light) roughness that provides a diffuse reflective surface. Thus, semi-diffuse reflector 150 has the ability to gather light from a larger portion of foreground sky 124 than specular reflector 140. The light reflected by semi-diffuse reflector 150 represents an average of the visual appearance of the reflected portion of foreground sky 124 and, thus, in general, more closely matches the composition of background sky 122, particularly in a scenario such as when the foreground sky contains a lightly clouded blue sky and the background sky contains a blue-white horizon sky.

Semi-diffuse reflector 150 includes a plurality of convex spherical segments 152 on which reflective surface 154 is formed. The included half-angle (½θ) of each spherical segment 152 preferably should not be much larger that the expected minimum angle between a horizontal plane bisecting the spherical segment and a line extending through the center of curvature C of the spherical segment and vantage point 102" of a viewer. The dimensions of convex spherical segments 152 in the direction along reflective surface 154 and the distance between adjacent segments 152 (pitch) P may be any value down to about one micron.

Reflective surface 154 collects, and thus averages when viewed from a great distance, light over a solid angle of 40 steradians, where θ (in radians) is the included angle of spherical segment 152. For example, if θ=B/9 (20°) the light reflected from ambient sky near the reflector axis to vantage point 102" a great distance from reflective surface would be gathered from 4B/9 steradians. Any semi-diffuse reflector, including an ideal "cosine" reflector, that reflects up to 100% of the light incident to it is considered to be within the scope of the present invention.

The brightness of the sun is, of course, many times brighter than the brightest sky. Collecting light from a larger portion of foreground sky 124 attenuates the effect of the brightness of the reflected sun in approximate proportion to the ratio of the subtended solid angle of the sun to the subtended solid angle of the reflected (viewed) portion of the foreground sky. Since the included angle of the sun as viewed from the surface of the earth is about 0.55° C., when each spherical segment 152 has an included angle of 30', the ratio of the subtended solid angle of the sun to the subtended solid angle of the reflected portion of foreground sky 124 is approximately $6 \times 10^{-5}$. Thus, the brightness of the sun when the sun is in the reflected portion of foreground sky 124 is highly attenuated. An additional attenuation of apparent brightness of the sun of approximately 10 to 15 times that achieved by diffusion can be obtained by providing a transparent layer (not shown), discussed above, covering reflective surface 154 and containing one or more appropriate dyes that remove a substantial portion of the light of wavelengths longer than about 490 nm contained in the sunlight incident to the reflective surface.

FIG. 5A shows an alternative semi-diffuse reflector 150' containing surface features 156, 158, 160, 162, 164 that may be used in conjunction with or in place of convex spherical segments 152 shown in FIG. 4. Each surface feature provides reflective surface 154' with a corresponding shape that has particular light gathering characteristics. Surface feature 156 forms a depressed concave spherical reflective surface 166 in reflective surface 154'. Surface feature 158 protrudes from reflective surface 154' and contains a planar reflective surface 168. Surface feature 158 may be any length desired in the direction perpendicular to the plane of FIG. 5A. For example, the length of surface feature 158 may be selected to be equal to height H or may be any other value such as 10H. In addition, if reflective surface 154' is cylindrical or other closed-curve shape, surface feature 158 may be continuous around the entire periphery of the reflective surface.

Surface feature 160 is similar to surface feature 158 except that it forms a recess in reflective surface 154'. Similar to surface feature 158, surface feature 160 may be any length desired. Surface feature 162 protrudes from reflective surface 154' and contains a multifaceted reflective surface 169. The size, shape and number of facets on multifaceted reflective surface 169 may be any desired to suit a particular application. Surface feature 164 is similar to surface feature 162 except that it forms a recess in reflective surface 154'. Similar to surface feature 162, surface feature 164 may include any size, shape and number of facets desired to suit a particular application.

Each surface feature 156, 158, 160, 162, 164 may be used separately or in combination with other surface features. One skilled in the art will recognize that the surface features shown are merely illustrative of the many surface features shapes possible. One skilled in the art will also recognize that certain shapes may be more desirable in some applications than in others and that selection of surface feature shapes is dependent upon variables such as the compositions of foreground sky 124 and background sky 122 during which the camouflage is desired to be most effective and the size, shape and orientation of the component of the structure camouflaged with this aspect of the present invention. In addition, the semi-diffuse properties of reflector 150 may be provided by incorporating a flake-type pigment, such as an aluminum flake pigment, into an otherwise transparent layer (not shown).

Referring now to FIG. 5B, semi-diffuse reflector 150" includes surface features similar to semi-diffuse reflector 150' of FIG. 5A. However, semi-diffuse reflector 150" further includes a conformal transparent layer 170 adjacent reflective surface 154". Transparent layer 170 may be made of a material similar to that described above with respect to transparent layer 148, which may be provided solely to protect reflective surface 154", but may also be provided with certain dyes, described above, to prevent particular wavelengths of light incident semi-diffuse reflector from being reflected to an expected vantage point (not shown). Although transparent layer 170 is shown as being conformal such that its outer surface 172 contains surface features 156', 158', 160', 162', 164', the transparent layer may alternatively be non-conformal, e.g., such that outer surface 172 does not contain any surface features.

Referring again to FIG. 1, each horizontal, vertical and diagonal member 116, 118, 120 of brackets 108 may be camouflaged in accordance with the third aspect of the present invention mentioned above. In this aspect, light from background sky 122 and/or foreground sky 124 is captured, conducted to a region spaced from the region where the light is captured and emitted toward vantage point 102 so that the portions of brackets 108 facing the vantage point take on an appearance similar to or the same as background sky 122 when viewed by a viewer.

Figure 6:
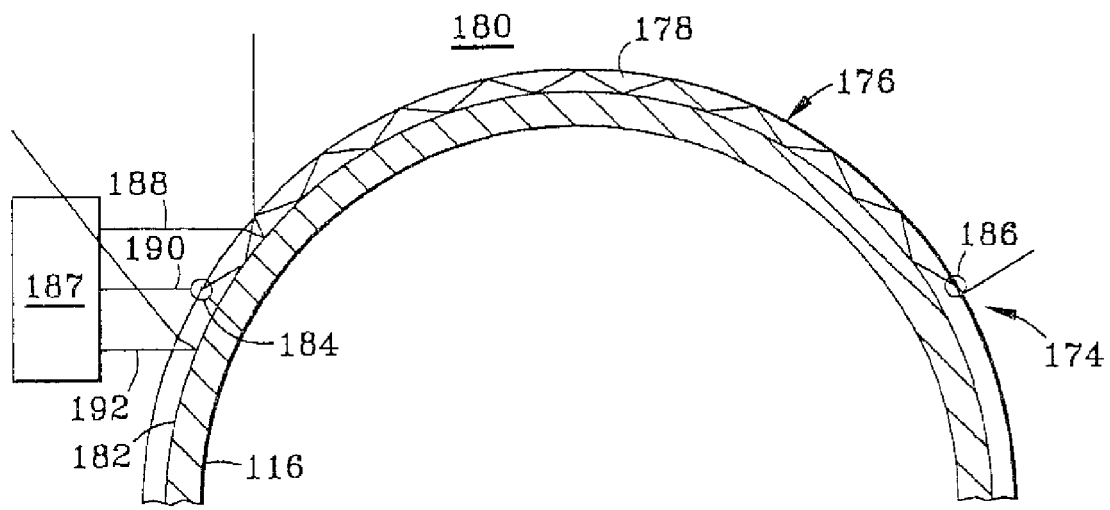
FIG. 6 is a partial cross-sectional view through a horizontal member of one of the antenna support brackets of FIG. 1 illustrating a camouflaging member in accordance with a third aspect of the present invention.

Referring now to FIG. 6, there is shown one of horizontal members 116 of bracket 108 of FIG. 1 that includes a camouflaging member 174 applied to the outer surface of the horizontal member. Camouflaging member 174 includes a conductor 176 that comprises a transparent layer 178 made of, e.g., acrylic, glass or the like, that provides the light conducting features of this aspect of the invention. Transparent layer 178 is made of a material having higher refractive index compared to the refractive index of the boundary material 180, in this case air, located outwardly adjacent the transparent layer. Transparent layer 178 may be applied to the outer surface of horizontal member 116 as a coating or may be a flexible sheet or rigid sheet attached to the horizontal member using adhesive, mechanical fasteners or other fastening means known in the art. Although camouflaging member 174 is shown as being generally circular in shape, it may be another shape, such as flat, oval or hexagonal, among others, which may or may not match the shape of the outer surface of horizontal member 116. One skilled in the art will recognize that if a hexagonal shape, or other shape having intersecting planar surfaces, is selected, the transitions between such intersecting surfaces must be sufficiently rounded for the proper conductance of light within the camouflaging member.

Conductor 176 includes a reflective surface 182 adjacent the outer surface of horizontal member 116 and plurality of light capturing/emitting features 184, 186 that aid in capturing light and/or emitting light rays conducted through transparent layer 178. Since light may travel in either direction along a particular path traced by a ray, a light capturing feature for a light ray traveling in one direction is a light emitting feature for a light ray traveling in the opposite direction. It is noted that reflective surface 182 need not be provided. However, providing reflective surface 182 generally improves the performance of camouflaging member 174 when the camouflaging member functions in accordance with the second aspect described above. As described in more detail below, light capturing/emitting features 184, 186 may be designed to capture incident light from particular regions of the background sky 122 and/or foreground sky 124 and emit the captured light toward the expected vantage point(s).

Depending on the location of an object (not shown), such as the sun, that emits and/or reflects light that contrast sharply in hue and/or brightness with the light in background sky 122, transparent layer 178 may include one or more certain dyes, as described above, to remove unwanted wavelengths of light before the light is emitted from camouflaging member 174.

To illustrate the optical characteristics of camouflaging member 174, a light source 187 emitting three generally parallel light rays 188, 190, 192 are shown. Rays 188, 192, enter transparent layer 178 and strike reflective surface 182 at an angle less than the angle of internal reflection of the transparent layer. Therefore, reflective surface 182 reflects rays 188, 192 out of transparent layer. Ray 190, however, is directed by light capturing/emitting feature 184 into transparent layer 178 so that its reflected angle is greater than the angle of internal reflection of the transparent layer. Thus, ray 190 is conducted through transparent layer 178 until it strikes emitting feature 186, which directs the ray out of the transparent layer preferably toward an expected vantage point.

Figure 7:
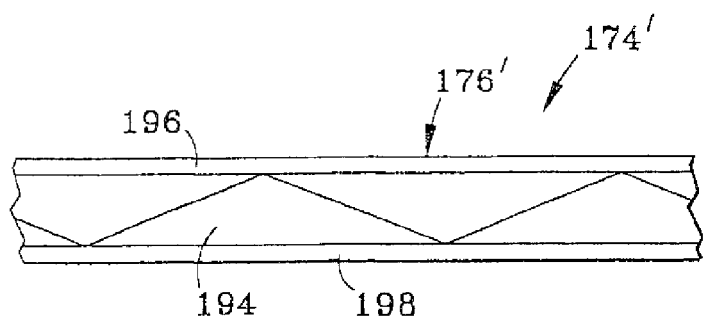
FIG. 7 is a cross-sectional view through a light conductor of a camouflaging member in accordance with the third aspect of the present invention.

FIG. 7 shows an alternative embodiment of camouflaging member 174', which comprises a conductor 176' that includes a center layer 194 made of, e.g., acrylic, sandwiched between two boundary layers 196, 198 made of, e.g., perfluoroalkoxy, which is available from, e.g., E.I. Dupont de Nemours & Company, Wilmington, Del., under the registered trademark TEFLON. The refractive index, nc, of center layer 194 is greater that the refractive index, nb, of each boundary layer 196, 1198. Preferably, the ratio nc/nb is greater than about 1.1. The selection of the value for this ratio, and thus suitable materials for center layer 194 and boundary layers 196, 198, is generally guided by the planarity of conductor 176' and the angular dispersion of light into the center layer at the light capturing/emitting features (not shown). The sandwich of layers illustrated in FIG. 7 may be repeated one or more times as required for light capturing, conducting and emitting to suit a particular design.

FIGS. 8A-8C and 9A-9C illustrate various light capturing/emitting features that may be used in conjunction with camouflaging members illustrated in FIGS. 6 and 7, or any other camouflaging member made in conformance with the present invention. In each of FIGS. 8A-8C, as well as in each of FIGS. 9A-9C, light can travel either in the direction of the rays illustrated or in the opposite direction, depending upon the location of light source.

Figure 8A:
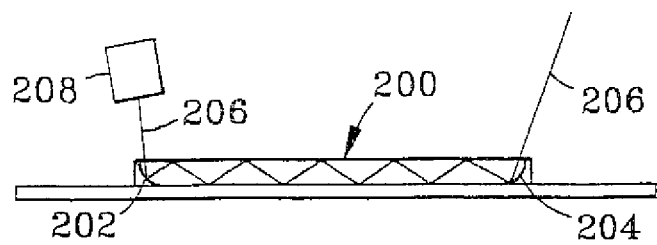
FIGS. 8A-8C are cross-sectional views of various camouflaging members in accordance with the third aspect of the present invention, illustrating light capturing/emitting features of a specular-reflector type.
Figure 8B:
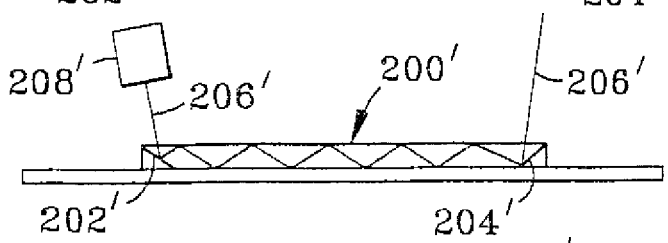
Figure 8C:
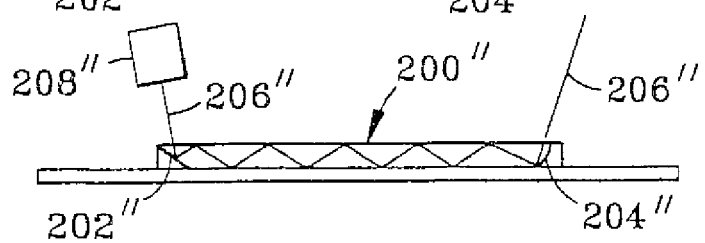

In FIGS. 8A-8C, each camouflaging member 200, 200', 200" contains one light capturing/emitting feature 202, 202', 202" located adjacent one edge of the camouflaging member and another light capturing/emitting feature 204, 204', 204" located at the opposite edge. Each light capturing/emitting features is either a planar specular reflector or a non-planar specular reflector. In FIG. 8A, light capturing/emitting feature 202 is a non-planar reflector and light capturing/emitting feature 204 is a planar reflector. In FIG. 5B, both light capturing/emitting features 202', 204' are planar reflectors. In FIG. 5C, light capturing/emitting feature 202" is a planar reflector and light capturing/emitting feature 204" is a non-planar reflector. When at least one of a pair of corresponding light capturing/emitting features, such as light capturing/emitting features 202, 204 of FIG. 8A, is a non-planar reflector, the light emitted from light conductor and viewed by a viewer will be composed of light from a large range of directions. Light rays 206, 206', 206" illustrate the effect that the various combinations of specular and non-planar reflectors have on the path of light from a corresponding light source 208, 208', 208", which in each of FIGS. 8A-8C is in the same position relative to corresponding camouflaging member 200, 200', 200".

Figure 9A:
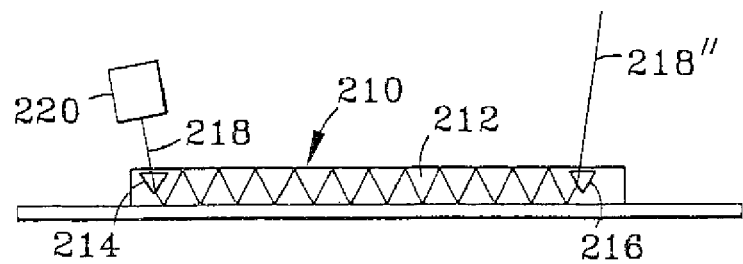
FIGS. 9A-9C are cross-sectional views of various camouflaging members in accordance with the third aspect of the present invention, illustrating light capturing/emitting features of a refractive index gradient-reflector type and a refractive-element type.
Figure 9B:
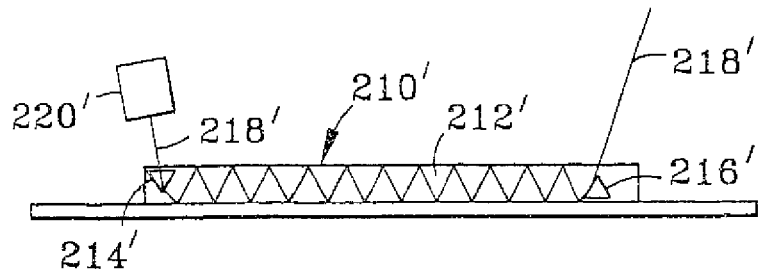
Figure 9C:
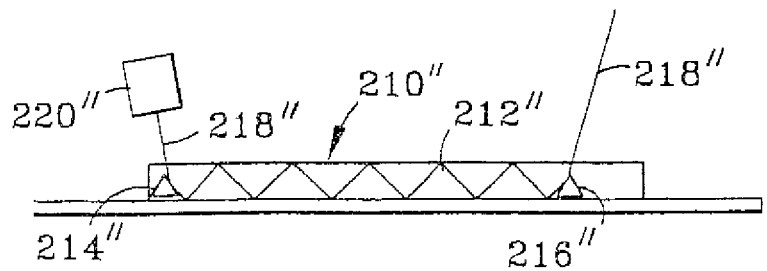

Camouflaging members 210, 210', 210" of FIGS. 9A-9C are similar to camouflaging members 200, 200', 200" of FIGS. 8A-8C, except that the light capturing/emitting features comprise transparent objects, such as the triangular prisms shown, wherein the refractive indices of the light capturing/emitting features are different from the refractive index of the surrounding material 212, 212', 212". Thus, depending on the orientation of and direction of light incident to each prism, each prism may cause a change in direction of the incident light either by reflection or refraction. Although objects are shown as being triangular prisms, they may be other prismatic or lion-prismatic shapes.

Accordingly, FIG. 9A shows an example in which light capturing/emitting features 214, 216 redirect a light ray 218 from a light source 220 by refraction. The refractive index of each light capturing/emitting feature 214, 216 in this example is 2.0 and the refractive index of material 212 is 1.5. FIG. 9B shows an example in which light capturing/emitting feature 214' redirects a light ray 218' from light source 220' by refraction and light capturing/emitting feature 216' redirects the light ray by reflection. In this example, the refractive index of light capturing/emitting feature 214' is 2.0, the refractive index of light capturing/emitting feature 216' is 1.1 and the refractive index of material 212' is 1.5. FIG. 9C shows an example in which both light capturing/emitting features 214", 216" redirect a light ray 218" from a light source 220" by reflection. The refractive index of each light capturing/emitting feature 214", 216" in this example is 1.1 and the refractive index of material 212" is 1.5. It is noted that when features 214 and 216 are implemented as a prism, whether the prism is reflective or refractive for a particular ray of light depends upon the orientation of the prism about its longitudinal axis (perpendicular to the plane of FIGS. 9A-9C), the refractive indices of material and the prism and the relative orientation of the light ray incident to the prism. Light rays 218, 218', 218" illustrate the effect that the various combinations of prism orientations and refractive indices have on the path of light from light sources 220, 220', 220", which in each of FIGS. 9A-9C is in the same position relative to corresponding camouflaging member 210, 210', 210".

FIG. 10 shows an alternative embodiment of camouflaging members 210, 210', 210" shown in FIGS. 9A-9C. In FIG. 10, camouflaging member 222 includes a transparent center layer 224 sandwiched between two transparent boundary layers 226, 228, which may comprise the same material as one another or different materials. Center layer 224 has a refractive index greater than each of the refractive indices of boundary layers 226, 228. Center layer 224 contains a plurality of transparent microspheres 230 that each has a refractive index less than the refractive index of the center layer. Preferably, the refractive index of each microsphere 230 is less than about 0.9 times the refractive index of center layer 224. Microspheres 230 can act as either reflecting elements or refracting elements, depending upon factors such as the indices of refraction of center layer 224 and each microsphere, the location on the surface of the microsphere that incident light ray strikes the microsphere, and the relative orientation of the incident light ray with respect to the microsphere. Light rays 232, 234, 236 illustrate three possible paths of light through camouflaging member 222.

Microspheres 230 are of different sizes and are distributed generally randomly throughput center layer 224. However, in alternative embodiments, microspheres 230 may all be of the same size and/or may be distributed uniformly or non-uniformly in center layer 224, depending upon the requirements of a particular design. Microspheres 230 are preferably gas bubbles, such as air bubbles, formed within center layer 224 during its manufacture. However, microspheres 230 may be another structure, such as beads of a solid material, that were, e.g., added to center layer during its manufacture. Although microspheres 230 are illustrated, one skilled in the art will recognize that other reflective and/or refractive features of regular and/or irregular geometric shapes may be provided. Such features may be oriented within center layer uniformly, non-uniformly or randomly.

Camouflaging member 222 may optionally include a reflective surface 238 located adjacent the outer surface of the structure (not shown) desired to be rendered less visible using the present invention. Reflective surface 238 is provided to reflect light rays not otherwise conducted by internal reflection within center layer 224 to aid in brightening camouflaging member 222 so that it more closely matches the brightness of the background sky. Reflective surface 238 may be provided on the outer surface of the structure or may be formed by metalizing the outer surface of boundary layer 228 using a method known in the art. Preferably, reflective surface forms a semi-diffuse reflector, as described above. However, reflective surface 238 may also be specular.

Referring now to FIG. 11, there is shown a camouflaging member 240 that includes light capturing/emitting features 242 that protrude from light conductor 244. Light conductor 244 includes a center layer 246 generally sandwiched between two boundary layers 248, 250 having lower refractive indices than the center layer. Center layer 246 consists of discrete low refractive index regions 252 and discrete high refractive index regions 254. Each light capturing/emitting feature 242 is generally a prism having a triangular cross-sectional shape that captures incident light from the foreground or background sky and/or emits light conducted within center layer 246. The particular arrangement of low and high refractive index regions 252, 254 is suited to optimize internal reflection in conducting regions 256 and create refractive index gradient reflectors 258. Refractive index gradient reflectors 258 direct light captured by light capturing/emitting features 242 into one of conducting regions 256 and/or direct light from one of the conducting regions to one of light capturing/emitting features 242. Camouflaging member 240 may optionally include reflective surfaces 260 located on boundary layer 250 opposite each low refractive index region 252. Reflective surfaces 260 assists the efficiency of camouflaging member 240 by reflecting some of the light within center layer 246 that enters low refractive index regions 252 such that it exits the low refractive index regions to brighten camouflaging member 240. FIG. 11 illustrates the paths that four light rays 262, 264, 266, 268 from a light source 270 placed in four different positions trace through camouflaging member 240.

An increase in light capturing efficiency may be obtained in a preferred direction when light capturing/emitting features 242 are not symmetrical about a horizontal axis as shown, but rather are skewed so as to present a greater surface toward the preferred direction. An embodiment illustrating this feature is shown in FIG. 12.

Figure 12:
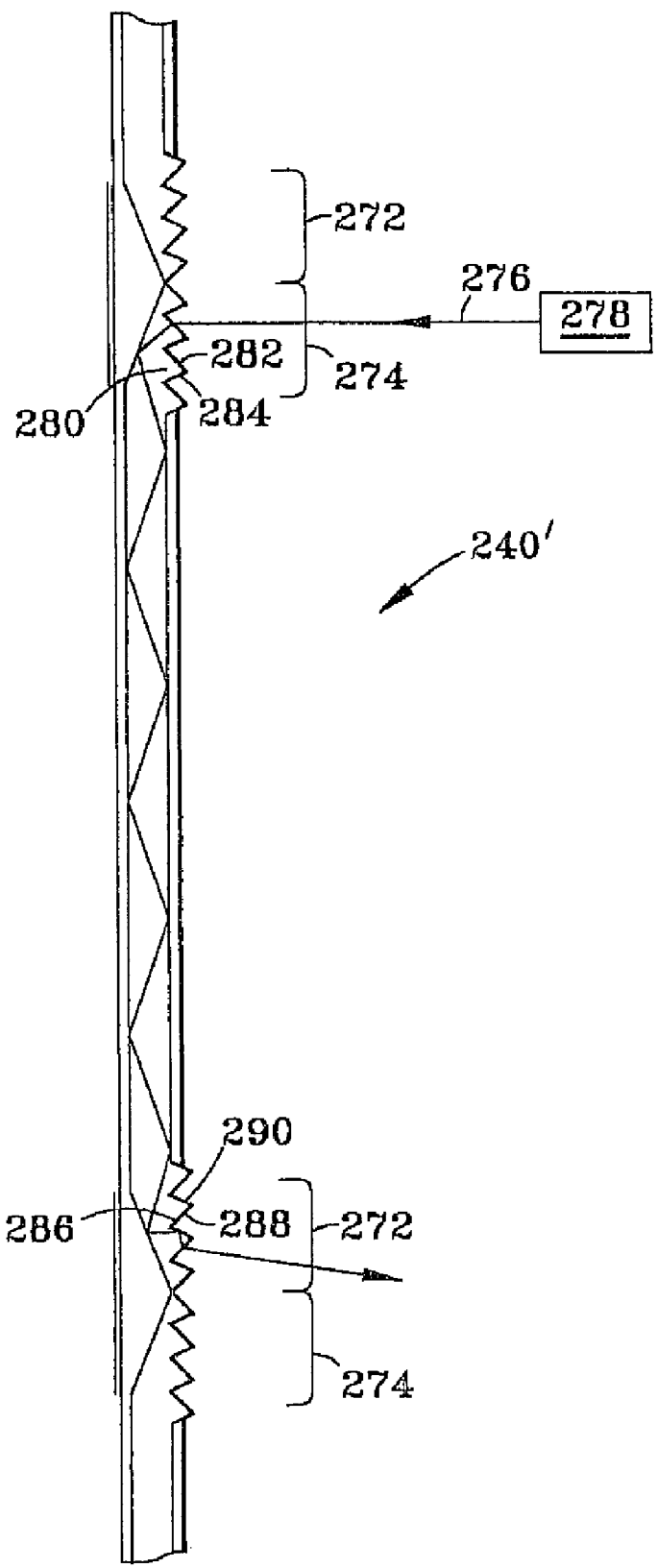
FIG. 12 is a cross-sectional view of yet another alternative embodiment of a camouflaging member in accordance with the third aspect of the present invention.

Referring to FIG. 12, camouflaging member 240' includes four groups of light capturing/emitting features arranged in pairs consisting of all upper group 272 and a lower group 274. In the orientation of camouflaging member 240' shown, lower groups 272 are for capturing light rays, such as ray 276, from a light source, such as light source 278, located generally above a horizontal line extending through the corresponding lower group 274. Similarly, upper groups 272 are for emitting light captured by lower groups 274 in a direction generally outward and downward from the corresponding upper group. However, due to the reversibility of light rays, light ray 276 may trace the direction opposite the direction shown. Accordingly, cacti element 280 in lower groups 274 has a generally upward-facing surface 282 that is larger than corresponding generally downward-facing surface 284. Similarly, each element 286 in upper groups 272 has a generally downward-facing surface 288 that is larger than corresponding generally upward-facing surface 290.

Figure 13A:
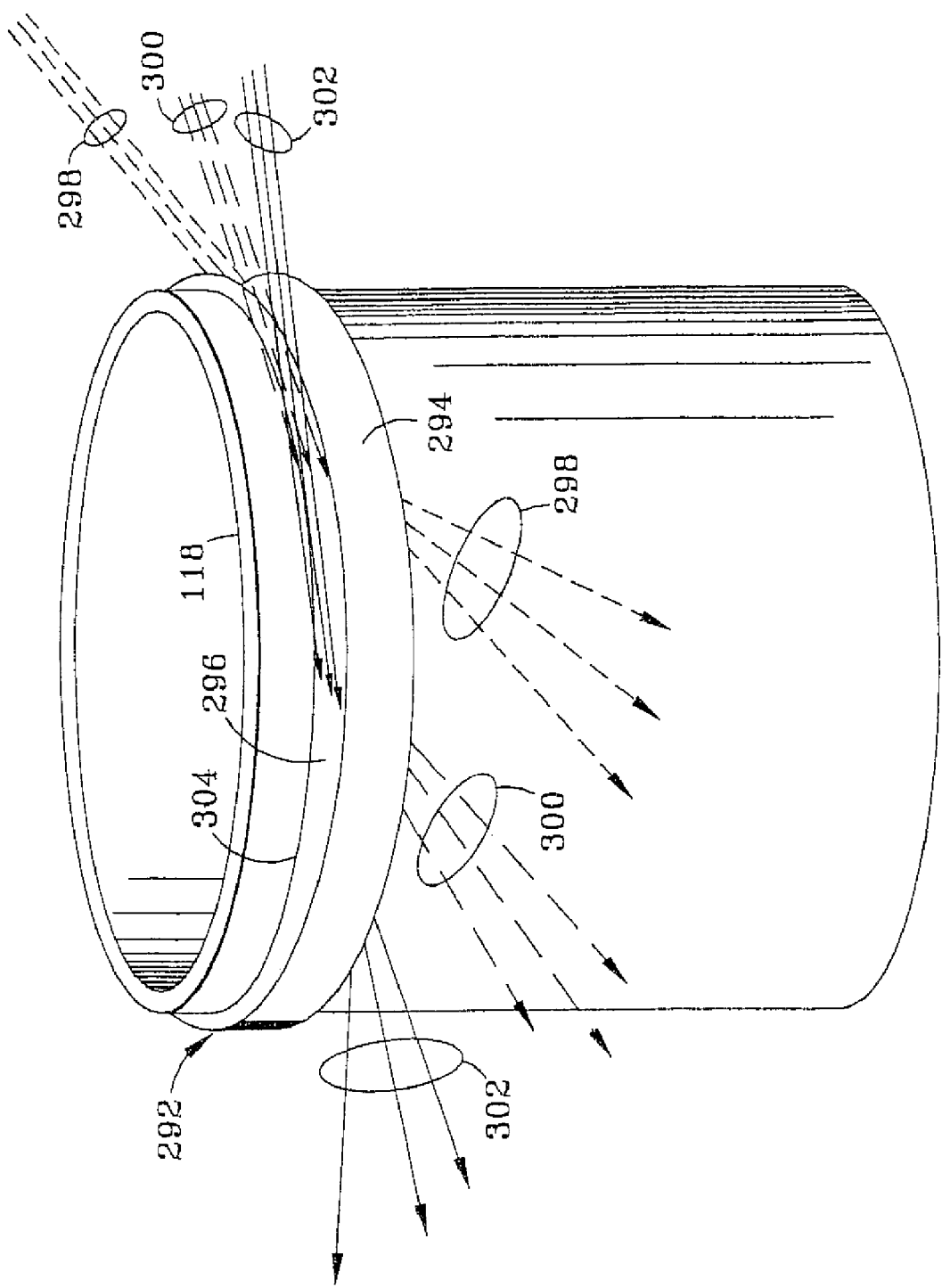
FIG. 13A is a perspective view of one of the vertical members of one of the antenna support brackets of FIG. 1, illustrating an alternative embodiment of a band-like camouflaging member in accordance with the third aspect of the present invention.

Referring flow to FIG. 13A, there is shown an alternative embodiment of a camouflaging member 292 that does not include discrete light capturing/emitting elements, but rather comprises a conductor 294 made of transparent material that forms a band that encircles a structure, such as one of vertical members 118 of FIG. 1, desired to be rendered less visible. The transparent material may be a flexible or rigid polymer, glass or other transparent material. If desired, the transparent material may further include one or more certain dyes, as described above, that filter unwanted wavelengths of light.

When light impinges upon camouflaging member 292 from above, upper surface 296 of conductor functions as the light capturing feature that directs light rays into the conductor. Correspondingly, lower surface (not shown) of conductor functions as the light emitting feature that directs light rays to an expected vantage point located below camouflaging member 292. Conversely, when light impinges upon camouflaging member 292 from below, the lower surface functions as the light capturing feature and upper surface 296 functions as the light emitting feature that directs light rays to an expected vantage point located above the camouflaging member. Upper surface 296 and the lower surface may be parallel to one another or they may be skewed in any direction, depending upon the particular design parameters. FIG. 13A illustrates how the paths that three groups 298, 300, 302 of light rays are affected by camouflaging member 292. In general, light rays originating in background sky are conducted by conductor toward foreground sky 124 and an expected vantage point located opposite the background sky.

One or both of upper surface 296 and the lower surface optionally may include surface features (not shown), such as convex spherical protrusions and pyramid-shaped protrusions, that diffuse and/or direct the light rays entering or exiting camouflaging member. In FIG. 13A, such surface features are provided on lower surface and thus cause the light rays in each group 298, 300, 302 to diverge from one another. Camouflaging member 292 may further include a reflective surface (not shown), which may be specular, semi-diffuse or contain regions of each, located on inner surface 304 to enhance the brightness of camouflaging member 292.

Figure 13B:
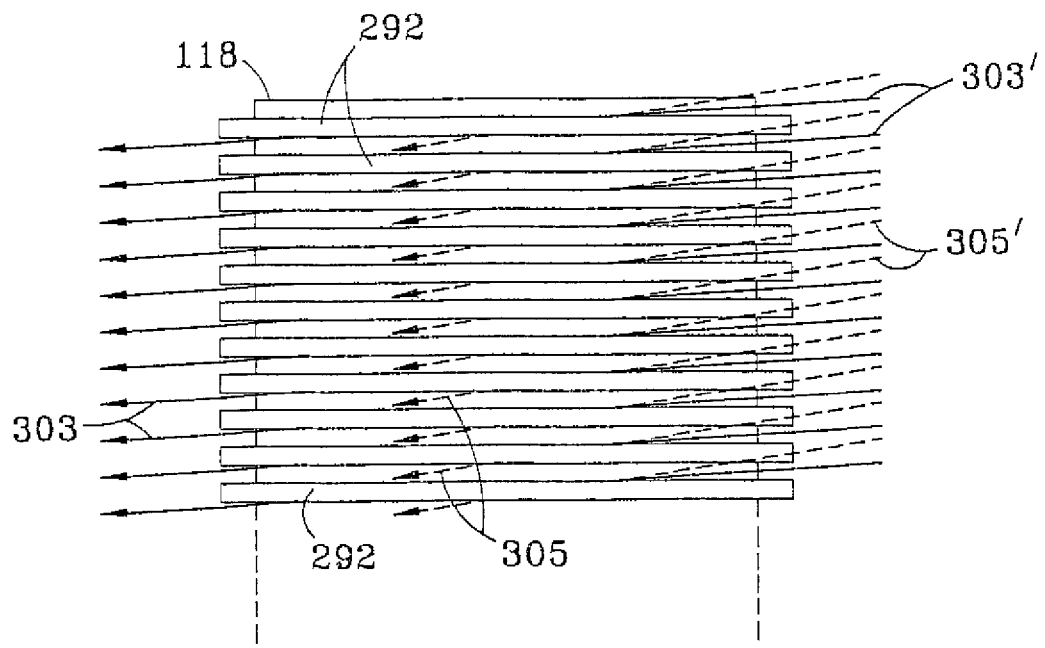
FIG. 13B is an elevational view of one of the vertical members of one of the antenna support brackets of FIG. 1, illustrating camouflage comprising a plurality of band-like camouflaging members similar to the camouflaging member shown in FIG. 13A.

Preferably, as shown in FIG. 13B, a plurality of camouflaging members 292 are used in conjunction with one another to produce a generally uniform brightening effect over the entire surface of vertical member 118 that is viewable from expected vantage point. Although camouflaging members 292 are shown as being separate circular hands, one or more camouflaging members forming another shape, e.g., a spiral, around vertical member 118 may be used. In addition, camouflaging members having widths different from one another and/or spaced from adjacent camouflaging members at different distances may be used. The spaces between adjacent camouflaging members allow light to enter each band 292 it one of the upper and lower surfaces and exit the corresponding band at the other of the upper and lower surfaces, depending upon the direction of incident light rays. The locations on each camouflaging member 292 where emitted light rays 303, 305 are emitted depend upon variable such as location and angle of incident light rays 303', 305' width of the corresponding camouflaging member and the refractive index of the material from which the camouflaging member is made.

Figure 13C:
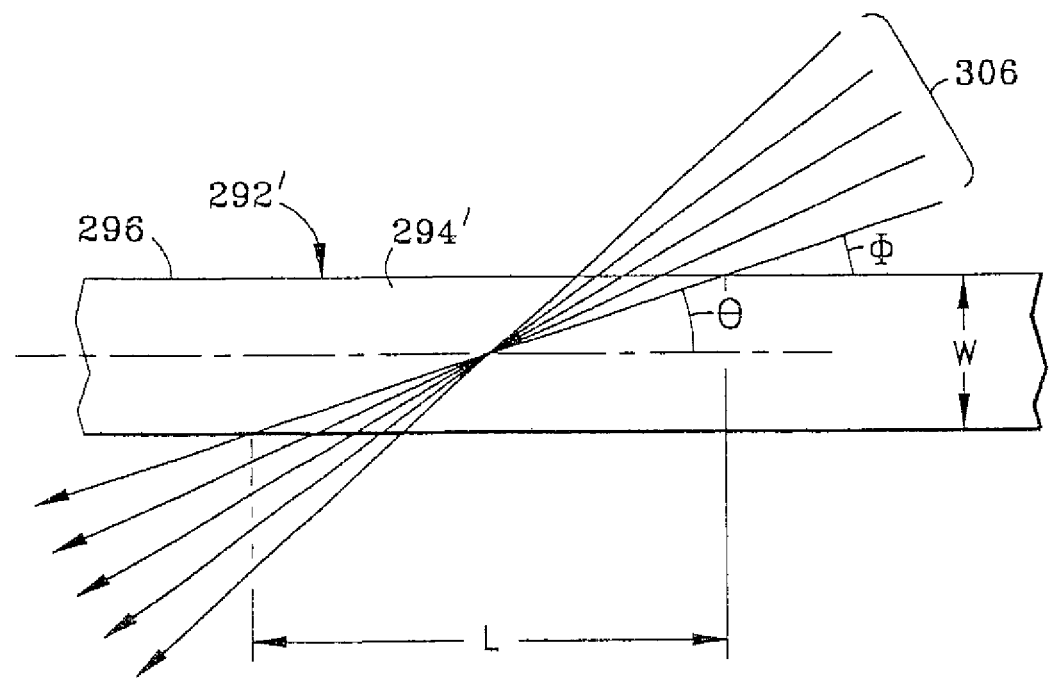
FIG. 13C is an elevational view of a camouflaging member similar to the camouflaging members shown in FIGS. 13A and 13B, illustrating the effect of the camouflaging members on various light rays.

FIG. 13C illustrates generally how light rays 306 trace through a camouflaging member 292' comprising a conductor 294' made of transparent material having a width W when the light rays enter the camouflaging members at upper surface 296 at various angles N with respect to the upper surface. Angle θ is the angle that each light ray defines with respect to the horizontal centerline 308 of camouflaging member 292'. For a given width W and incident angle N, angle θ, and therefore distance L, varies with the refractive index of the transparent material. Width W may be any value desired to suit a particular application.

Figure 14A:
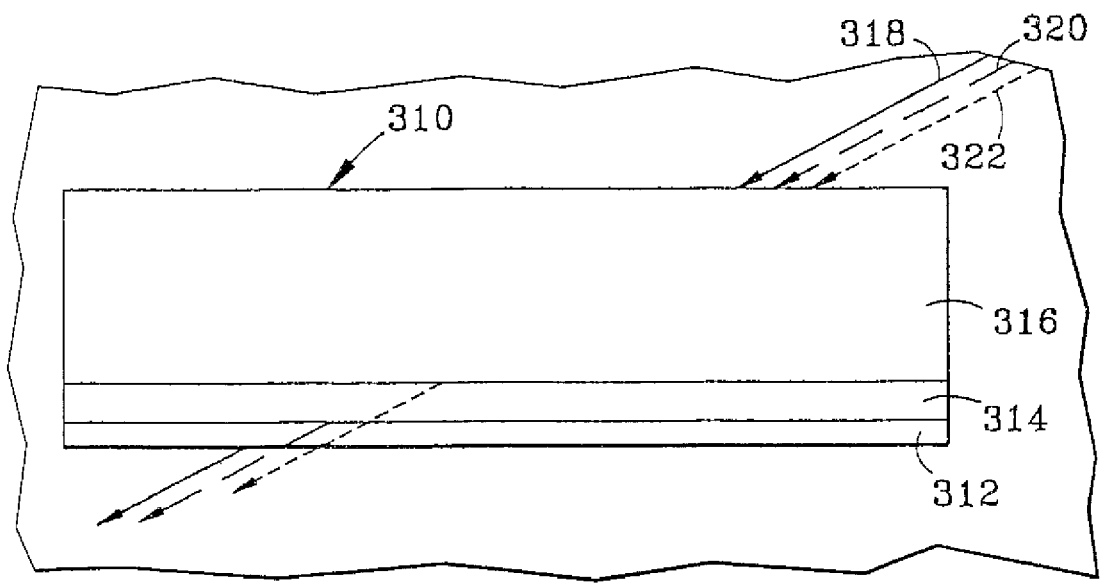
FIGS. 14A and 14B are respectively, an elevational view and a cross-sectional view of a laminated camouflaging member in accordance with the third aspect of the present invention.
Figure 14B:
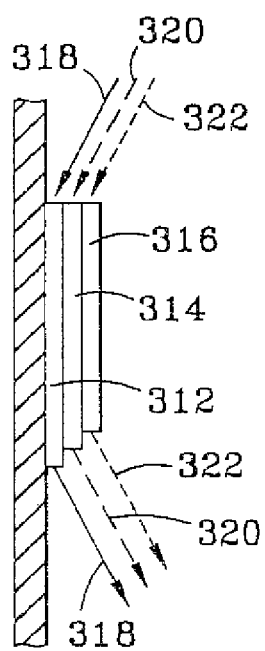

FIGS. 14A and 14B show a composite camouflaging member 310 comprising three separate conductors 312, 314, 316 of different widths located adjacent one another. The different widths cause incident light rays 318, 320, 322 that are parallel to one another in a plane perpendicular to the figure to exit the corresponding conductor 312, 314, 316 at different locations along the length of camouflaging member 310. If camouflaging member 310 were non-planar, e.g., if camouflaging member 310 were annular similar to camouflaging member 292 of FIGS. 13A and 13B, light would exit the camouflaging member at different locations along the length of the camouflaging member and in directions different from one another, resulting in a gradient of brightness that is greatest at the viewed edge and thus obscuring the viewed edge against the background sky.

Although the various aspects of the present invention have been described in connection with particular components of cell tower of FIG. 1, one skilled in the art will recognize that invention is not so limited and that any of the aspects may be used with any of the components. Variables that should be considered when selecting among the several aspects includes the various compositions of the background and foreground sky during the time cell tower is to be obscured, the locations of the expected vantage points, the location(s) and intensity of any contrasting object(s) in the sky and the function of the component camouflaged.

While the present invention has been described in connection with preferred embodiments, it will be understood that it is not so limited. On the contrary, it is intended to cover all alternatives, modifications and equivalents as may be included within the spirit and scope of the invention as defined in the appended claims.

What is claimed is:

1. A method of camouflaging an exterior surface of a structure not intended for human occupancy, the structure located between a vantage point and a background having a first generally uniform composition, wherein a foreground extends away from the structure in a direction opposite the background, the foreground having a second generally uniform composition substantially the same as the first generally uniform composition, the method comprising:

locating at least one semi-diffuse reflector between the vantage point and an exterior surface of a structure not intended for human occupancy, said at least one semi-diffuse reflector including a corresponding respective reflective surface; and positioning each of said at least one semi-diffuse reflector such that said corresponding respective reflective surface reflects light from a portion of the foreground to the vantage point so as to effect a blending of at least a portion of said structure into the background when viewed from the vantage point.

2. The method of claim 1, wherein the second generally uniform composition of the foreground comprises characteristic wavelengths of visible light, the method further comprising a step of filtering from light incident said corresponding respective reflective surface at least one wavelength of visible light different from the characteristic wavelengths.

3. The method of claim 2, wherein the step of filtering said at least one wavelength filters at least one wavelength of the orange-red portion of the visible light spectrum.

4. The method of claim 1, wherein the step of locating said at least one semi-diffuse reflector includes locating a plurality of semi-diffuse reflectors and the step of positioning each of said at least one semi-diffuse reflector includes positioning each of said plurality of semi-diffuse reflectors such that said corresponding respective reflective surfaces reflect light from a portion of the foreground to the vantage point so as to effect a blending of said structure into the background when viewed from the vantage point.

5. The method of claim 4, wherein the step of locating said at least one semi-diffuse reflector includes locating a plurality of semi-diffuse reflectors each including a reflective surface having an area of less than 25 in$^2$ (161.3 cm$^2$).

6. The method of claim 4, wherein the step of locating said plurality of semi-diffuse reflectors includes locating said plurality of semi-diffuse reflectors between the vantage point and an exterior surface of a support tower.

7. The method of claim 4, wherein the step of locating said plurality of semi-diffuse reflectors includes locating said plurality of semi-diffuse reflectors between the vantage point and an exterior surface of a cooling tower.

8. The method of claim 4, wherein the step of locating said plurality of semi-diffuse reflectors includes locating said plurality of semi-diffuse reflectors between the vantage point and an exterior surface of a chimney.

9. The method of claim 1, wherein the step of locating said at least one semi-diffuse reflector includes locating said at least one semi-diffuse reflector between the vantage point and an exterior surface of a support tower.

10. The method of claim 1, wherein the step of locating said at least one semi-diffuse reflector includes locating said at least one semi-diffuse reflector between the vantage point and an exterior surface of a cooling tower.

11. The method of claim 1, wherein the step of locating said at least one semi-diffuse reflector includes locating said at least one semi-diffuse reflector between the vantage point and an exterior surface of a chimney.

12. A method of camouflaging an exterior surface of a structure not intended for human occupancy, the structure located between a vantage point and a background having a first generally uniform composition, wherein a foreground extends away from the structure in a direction opposite the background, the foreground having a second generally uniform composition comprising characteristic wavelengths of visible light and being substantially the same as the first generally uniform composition, the method comprising:

locating at least one reflector between the vantage point and an exterior surface of a structure not intended for human occupancy, said at least one reflector including a corresponding respective reflective surface positioned so as to reflect light from a portion of the foreground to the vantage point to effect a blending of said structure into the background when viewed from the vantage point; and positioning a filter between the vantage point and each said corresponding respective reflective surface, said filter for filtering at least one wavelength of visible light that is different from the characteristic wavelengths of visible light.

13. The method of claim 12, wherein the step of positioning said filter includes positioning a filter that includes a transparent layer confronting said corresponding respective reflective surface and containing a dye for absorbing said at least one wavelength of visible light.

14. The method of claim 13, wherein the step of positioning said filter includes positioning a filter containing a dye for absorbing at least one wavelength in the red-orange part of the spectrum.

15. The method of claim 12, wherein the step of locating at least one reflector includes locating at least one semi-diffuse reflector between the vantage point and said external surface.

16. The method of claim 12, wherein the step of locating said at least one reflector includes locating said at least one reflector between the vantage point and an exterior surface of a support tower.

17. The method of claim 12, wherein the step of locating said at least one reflector includes locating said at least one reflector between the vantage point and an exterior surface of a cooling tower.

18. The method of claim 12, wherein the step of locating said at least one semi-diffuse reflector includes locating said at least one semi-diffuse reflector between the vantage point and an exterior surface of a chimney.

19. The method of claim 12, wherein the step of locating said at least one reflector includes locating a plurality of reflectors each including a reflective surface having an area of less than 25 in$^2$ (161.3 cm$^2$).

* * * * *